United States Patent
Ninomiya et al.

[11] Patent Number: 6,088,620
[45] Date of Patent: *Jul. 11, 2000

[54] COMPUTER SYSTEM IN WHICH A HIGH-ORDER APPLICATION PROGRAM RECOGNIZES A POWER-ON FACTOR OR A STATE OF AN EXPANSION UNIT

[75] Inventors: Ryoji Ninomiya; Koji Nakamura, both of Tokyo, Japan

[73] Assignee: Kabushiki Kaisha Toshiba, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/716,865

[22] Filed: Sep. 20, 1996

[30] Foreign Application Priority Data

Sep. 29, 1995 [JP] Japan .................................. 7-254156

[51] Int. Cl.$^7$ .................................................. G06F 9/445
[52] U.S. Cl. ............................. 700/16; 713/310; 713/323
[58] Field of Search ........................ 395/750.01, 750.05, 395/750.08, 182.12; 713/300, 323, 340, 14, 34; 364/145

[56] References Cited

U.S. PATENT DOCUMENTS

| | | | |
|---|---|---|---|
| 5,008,846 | 4/1991 | Inone ........................................ 364/707 |
| 5,151,992 | 9/1992 | Nagae ................................. 395/750.01 |
| 5,239,495 | 8/1993 | Nanno et al. ............................ 364/707 |
| 5,299,322 | 3/1994 | Arai et al. ................................ 395/275 |
| 5,301,334 | 4/1994 | Horiuchui ........................... 395/750.05 |
| 5,323,291 | 6/1994 | Boyle et al. ............................. 361/686 |
| 5,347,425 | 9/1994 | Herron et al. ........................... 361/686 |
| 5,377,357 | 12/1994 | Nishigaki et al. ....................... 395/800 |
| 5,381,043 | 1/1995 | Kohiyama et al. ...................... 307/116 |
| 5,410,712 | 4/1995 | Okuno ................................ 395/750.05 |
| 5,426,775 | 6/1995 | Boccon-Gibod .......................... 714/36 |
| 5,428,798 | 6/1995 | Sekine et al. ....................... 395/750.05 |
| 5,430,883 | 7/1995 | Horiuchi ............................. 395/750.05 |
| 5,432,938 | 7/1995 | Ohashi ................................... 395/700 |
| 5,440,748 | 8/1995 | Sekine et al. ....................... 395/750.05 |
| 5,457,801 | 10/1995 | Aihara ................................ 395/750.01 |
| 5,467,469 | 11/1995 | Saito et al. .......................... 395/182.12 |
| 5,475,271 | 12/1995 | Shibasaki et al. ........................ 307/31 |
| 5,483,646 | 1/1996 | Song ..................................... 364/492 |
| 5,539,876 | 7/1996 | Saito et al. .......................... 395/182.12 |
| 5,613,135 | 3/1997 | Sakai et al. ............................. 395/800 |
| 5,652,890 | 7/1997 | Foster et al. ............................ 713/300 |
| 5,664,118 | 9/1997 | Nishigaki et al. ....................... 395/283 |
| 5,678,050 | 10/1997 | Kudoh ................................ 395/750.01 |
| 5,689,715 | 11/1997 | Crump et al. ....................... 395/750.01 |
| 5,721,933 | 2/1998 | Walsh et al. ....................... 395/750.01 |

*Primary Examiner*—Paul R. Myers
*Attorney, Agent, or Firm*—Oblon, Spivak, McClelland, Maier & Neustadt, P.C.

[57] ABSTRACT

A computer system is provided has a computer main body and an expansion unit to be attached to and detached from the computer main body. Power is input to the computer system in accordance with a plurality of factors. A power supply controller determines which factor has caused power-ON for the computer system, and writes the result of this determination into a power-ON factor register. BIOS reads the content stored in the power-ON factor register and executes processing in accordance with power-ON factors. Before the computer system is switched on, the power supply controller determines the connection, type and state of the expansion unit and writes the result of this into the state register. BIOS executes error processing, etc., in accordance with the content of the state register.

18 Claims, 11 Drawing Sheets

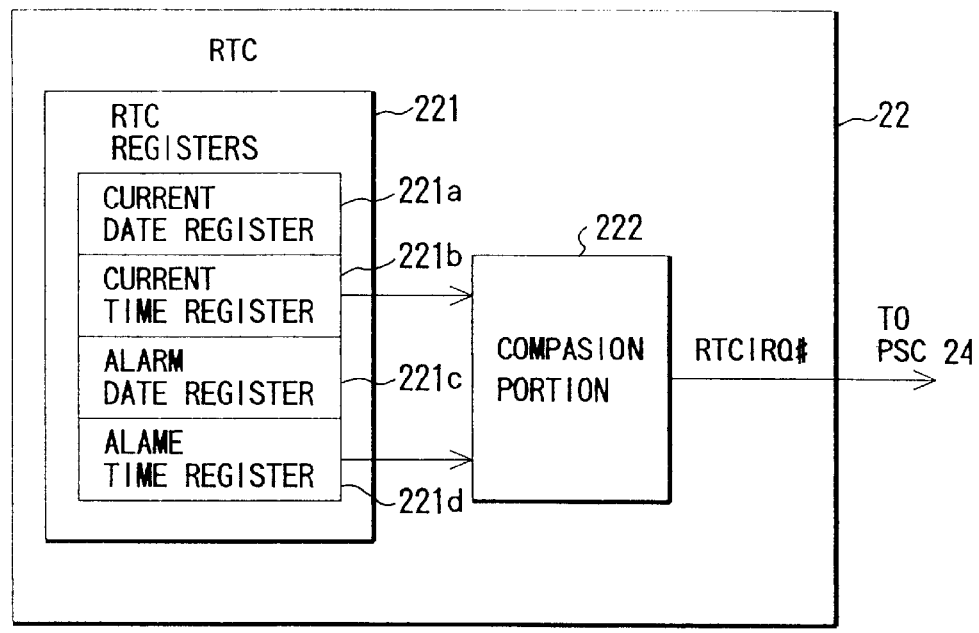
F I G. 4
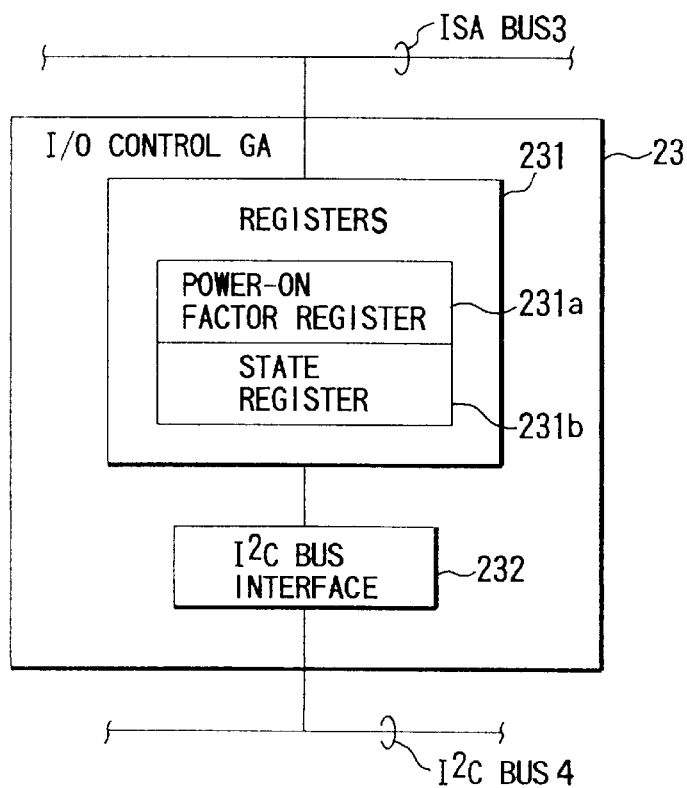
F I G. 5

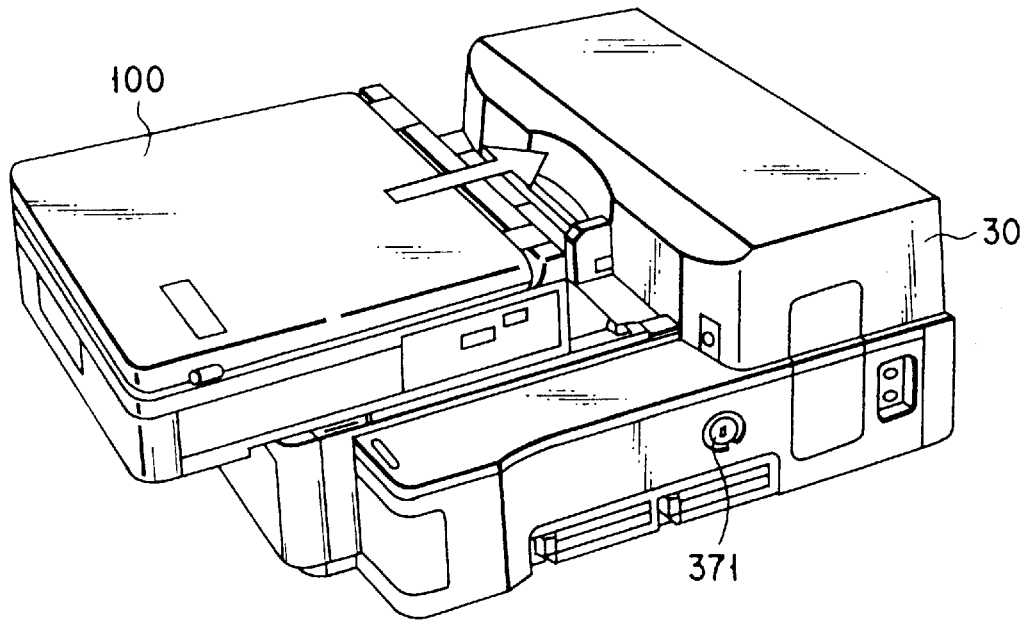
F I G. 7
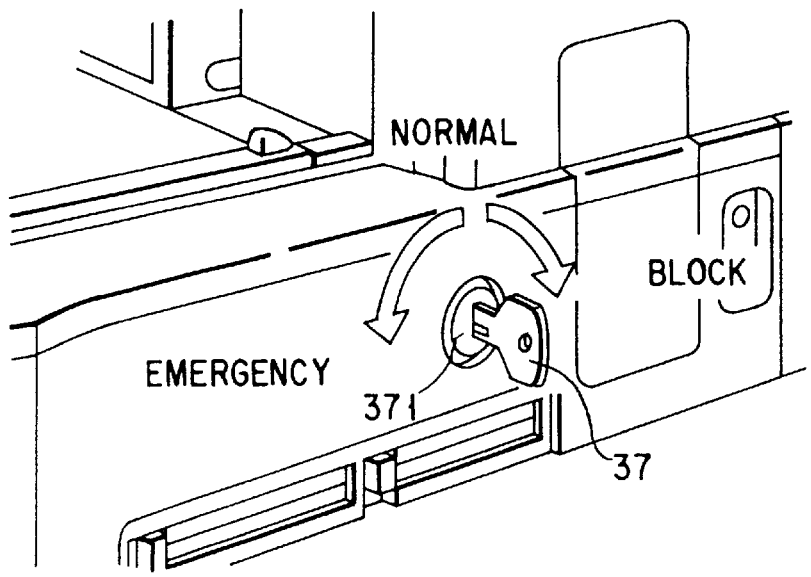
F I G. 8

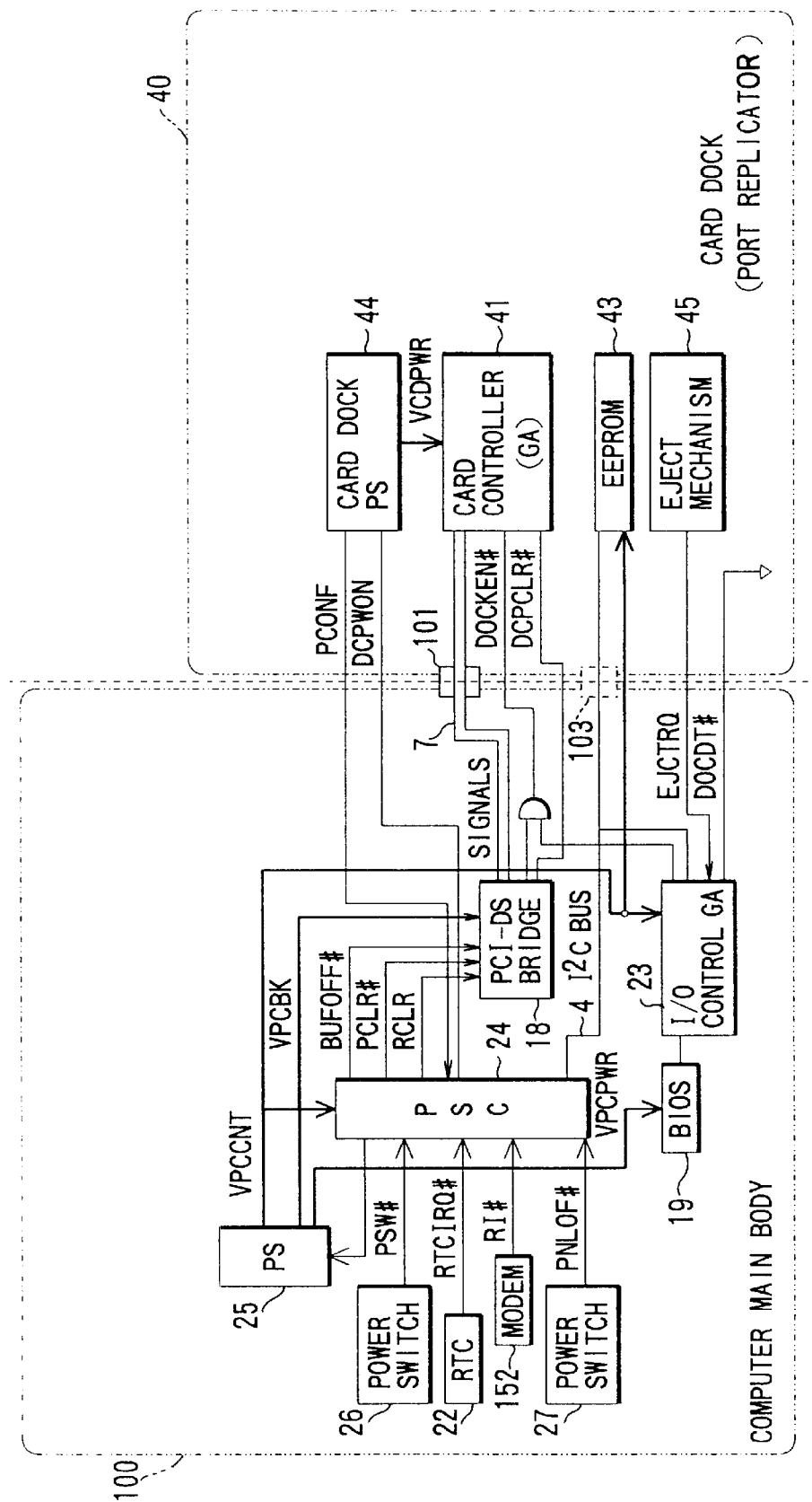
F I G. 11B

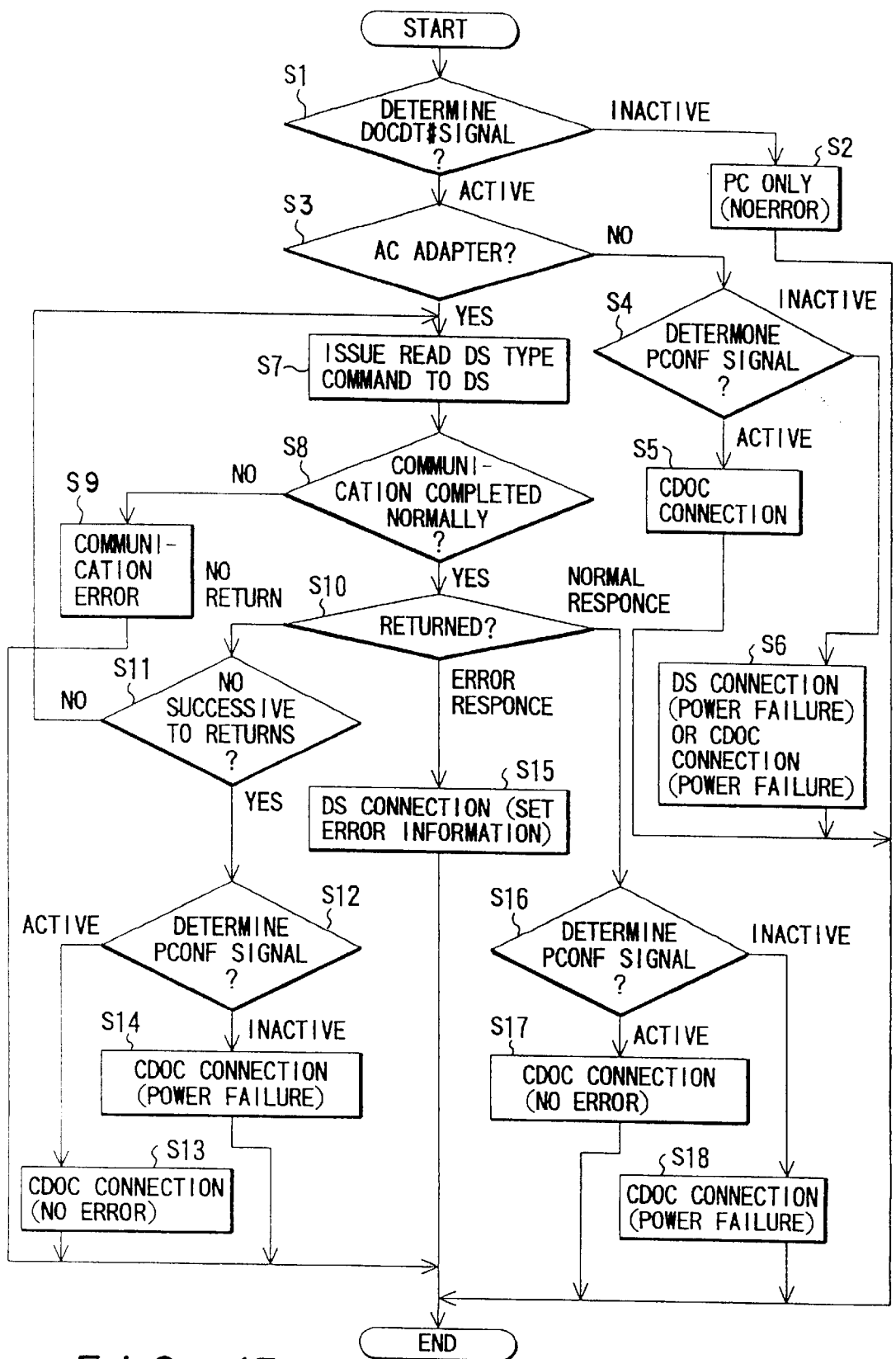
F I G. 13

| UNIT | PRIORITY | ERROR CODE | ERROR |
|---|---|---|---|
| DS/CDOC | - | 00h | NO ERROR |
| DS | HIGH ↑ | A0h | MECHANISM ERROR |
| | | A1h | LOCKING ERROR OF LOCK PIN |
| | | A2h | POWER FAILURE |
| | | A3h | DS: UNCONNECTION OF AC CODE WHEN TURNED ON POWER<br>CDOS: POWER FAILURE |
| | | A4h | COMMUNICATION ERROR |
| | ↓ LOW | A8h | KEY POSITION IS 'EMERGENCY" |
| | | A9h | KEY POSITION IS 'BLOCK" |
| CDOC | - | B2h | POWER FAILURE |

FIG. 14

COMPUTER SYSTEM IN WHICH A HIGH-ORDER APPLICATION PROGRAM RECOGNIZES A POWER-ON FACTOR OR A STATE OF AN EXPANSION UNIT

BACKGROUND OF THE INVENTION

1. Field of the Invention

The present invention relates to a computer system having a computer main body and an expansion unit which is connectable to the main body. More particularly, the present invention relates to the computer system capable of executing processing in accordance with power-ON factors of the computer main body.

2. Description of the Related Art

In recent years, various personal portable computers of a laptop type or a notebook type easily carried and operable by a battery have been developed. The portable computer of this type is provided with a plurality of power-ON factors, such as opening of a display panel, timer interruption, modeling interruption and the like, in addition to actuation of a power switch. In this specification, the power-ON indicates power supplement from a power supply to components of the computer.

Such a conventional portable computer, however, does not allow transmittance to a high-order application program, for instance an operating system, which the plurality of power-ON factors has started power supplement by a power supply. This makes it impossible to automatically execute processing according to power-ON factors.

As described above, in the conventional computer system, the high-order application program cannot recognize various power-ON factors even though the plurality of power-ON factors are provided. Consequently, it is impossible to execute processing according to various power-ON factors.

Furthermore, since the computer main body cannot recognize a power supplement condition of the connected expansion unit, inconveniences such as system hanging up may occur.

SUMMARY OF THE INVENTION

It is an object of the invention to provide a computer system, wherein by determining a power-ON factor for the computer system, a high-order application program is enabled to execute processing according to the power-ON factor.

According to the present invention there is provided a computer system comprising a timer for storing current data information, current time information, alarm date information and alarm time information, and for outputting a timer signal in accordance with the current time information and the alarm time information, the alarm date information and the alarm time information being set by an operator; a register for storing data indicating a factor which triggers a power ON for necessary components in the computer system; a power supply controller for storing in the register the data indicating a factor which triggers the power ON in response to the timer signal from the timer; and a control section formed of a high-order application program for, in response to the power supply controller storing the data indicating a factor which triggers the power ON, reading out the data indicating a factor which triggers the power ON stored in the register, for reading out the current data information and the alarm date information from the timer for determining the power-ON factor and for executing processing corresponding to the determined power-ON factor.

According to this computer system, when power supplement is started, the power supply controller sets information indicating a power-ON factor in the register. This enables a high-order application program, for instance an operating system, to execute processing according to the factor of power supplement starting by referring to the register.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 4 is a block diagram showing the structure of a real time clock (RTC) of the computer main body shown in FIG. 1;

FIG. 5 is a block diagram showing the structure of a I/O control GA of the computer main body shown in FIG. 1;

FIG. 7 is a view showing docking of the computer main body with its structure shown in FIG. 1 with the docking station shown in FIG. 6;

FIG. 8 is a view for explaining a locking mechanism provided in the docking station shown in FIG. 6;

FIGS. 11A and 11B are views respectively showing a connection structure for controlling of docking/undocking between the computer main body and the docking station and between the computer main body and the card dock, used in the computer system of the embodiment;

FIG. 13 is a flow chart showing an operation procedure of the computer main body for determining a docking state and a power supplement condition for the docking station or the card dock to which the computer main body is connected in the sequence of FIG. 12; and FIG. 14 is a view showing an example of an error code set in the register of the I/O control GA in processing shown in FIG. 13.

DETAILED DESCRIPTION OF THE PREFERRED EMBODIMENTS

The preferred embodiment of the invention will now be described with reference to the accompanying drawings.

Figure 1:
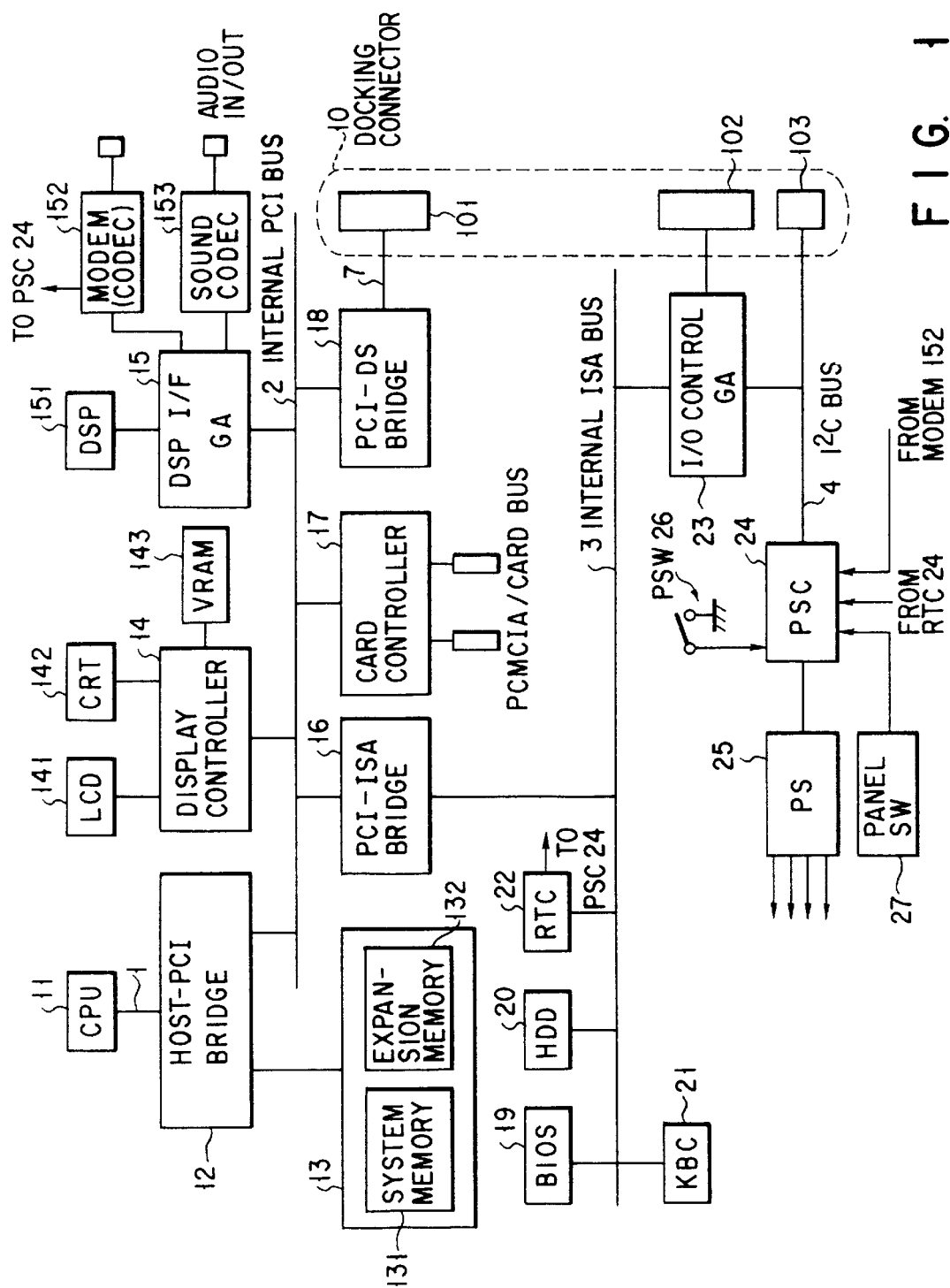
FIG. 1 is a block diagram showing the system structure of the computer main body of a computer system of an embodiment of the invention.
Figure 2:
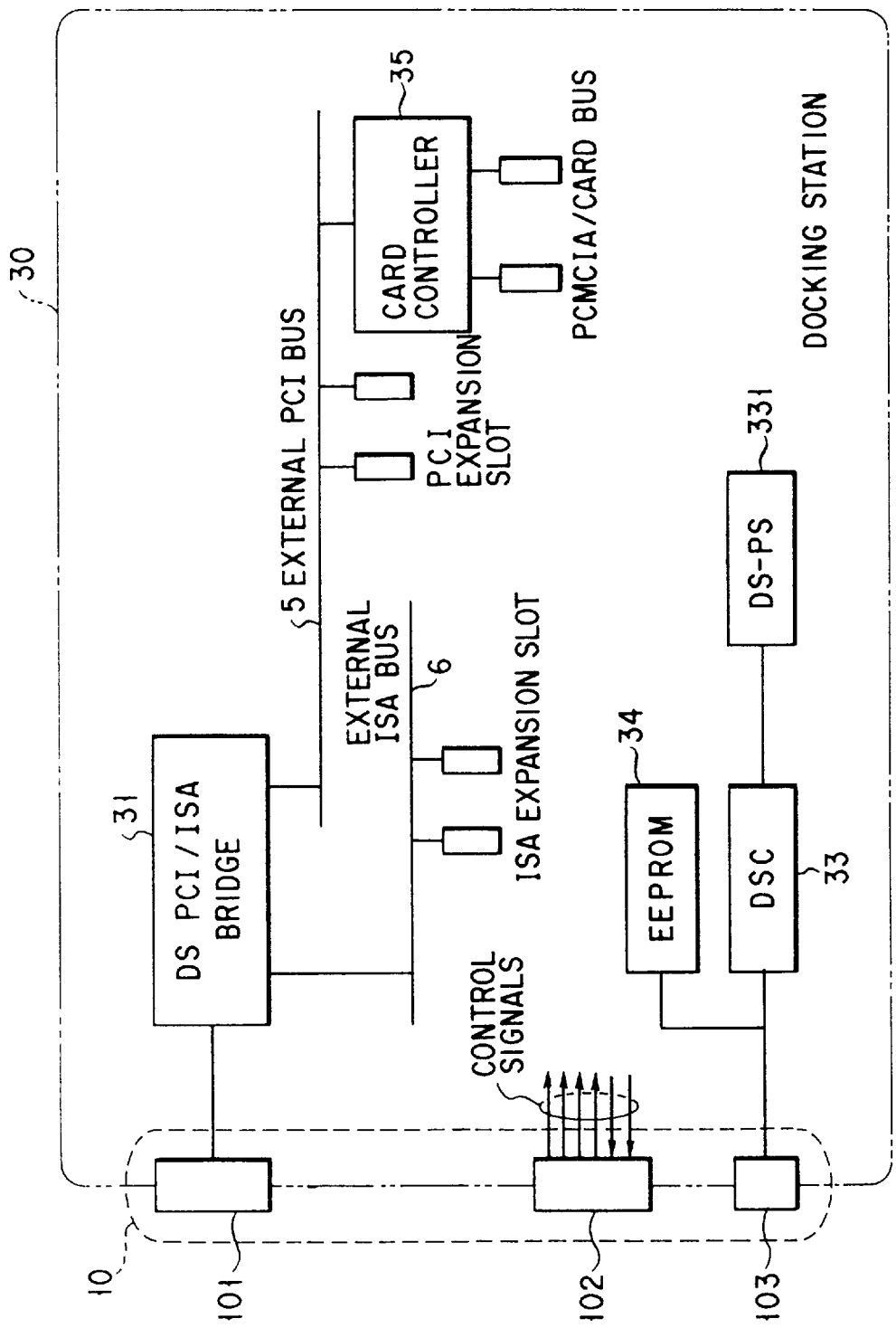
FIG. 2 is a block diagram showing the structure of a docking station used in the computer system of the embodiment.
Figure 3:
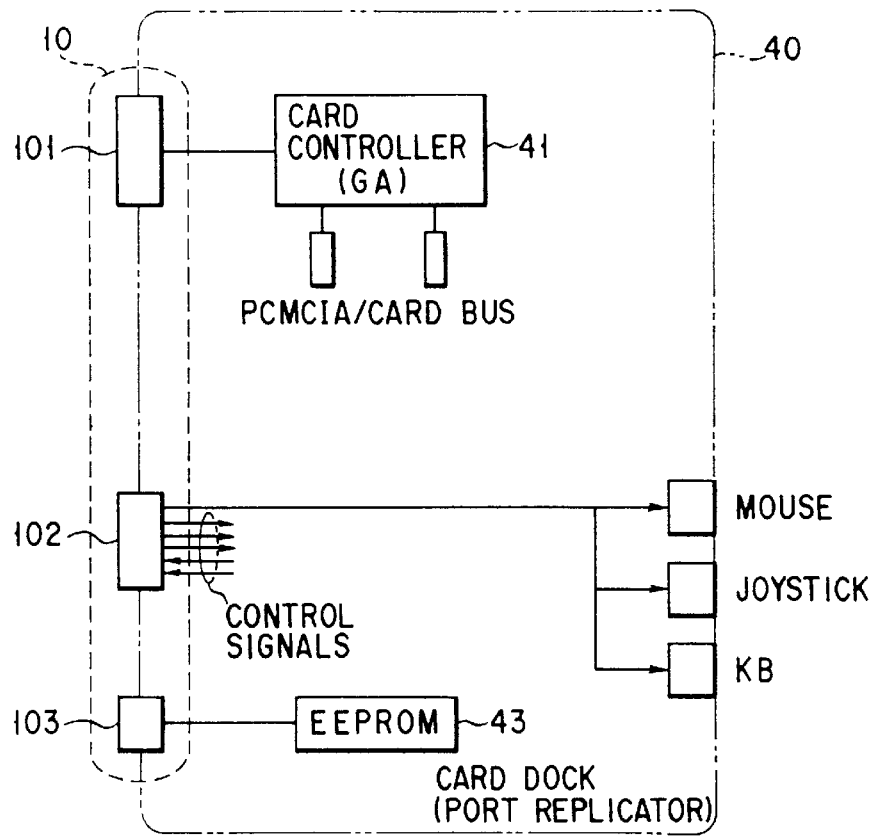
FIG. 3 is a block diagram showing the structure of a card dock used in the computer system of the embodiment.

FIG. 1 shows the structure of the computer main body of a computer system of an embodiment of the invention. This computer is a portable computer of a notebook or a laptop type driven by a battery. On the system board of this computer main body, a processor bus 1, an internal Peripheral Component Interconnect (PCI) bus 2, an internal Industry Standard Architecture (ISA) bus 3 and I²C bus 4 are disposed. As an expansion unit for expanding functions of the computer main body, a docking station 30 shown in FIG. 2 or a card dock (port replicator) 40 shown in FIG. 3 is connected to a docking connector 10 provided in the portable computer main body by a user as necessary. The docking connector 10 is constructed by three pin groups 101, 102 and 103 as shown in FIG. 1.

In the computer main body, there are provided a Central Processing Unit (CPU) 11, a host/PCI bridge 12, a memory 13, a display controller 14, a Digital Signal Processing (DSP) interface gate array (DSP IF GA) 15, an internal PCI-ISA bridge 16, a card controller 17, a PCI-DS (DS: docking station) bridge 18, a BIOS ROM (BIOS: Basic Input Output System, ROM: Read-Only Memory) 19, a Hard Disk Drive (HDD) 20, a keyboard controller 21, a real time clock (RTC) 22, an I/O control gate array 23 and a power supply controller 24.

The docking station 30 is utilized for adding such expansion devices as a PCI expansion card, an ISA expansion card, a PC card, a HDD and a Compact Disk-Read-Only Memory (CD-ROM) drive. In this docking station 30, as shown in FIG. 2, an external PCI bus 5 and an external ISA bus 6 are disposed as expansion buses. Drive bays, PCI expansion slots and ISA expansion slots are connected to the buses. A DS-PCI/ISA bridge 31, a DS controller 33 and an EEPROM (Electrically Erasable and Programmable ROM) 34 are further provided in this docking station 30.

The card dock 40 is a port replicator having PC card slots. As shown in FIG. 3, an I/O port connector (mouse connector, keyboard connector and the like), a PC card controller 41 and an EEPROM 43 are provided therein.

Next, the function and structure of each component provided in the computer main body shown in FIG. 1 will be described.

As the CPU 11, for instance, a microprocessor "Pentium" produced and sold by U.S. Intel Company may be used. The processor bus 1 directly connected to the I/O pins of the CPU 11 has a data bus of 64-bit width.

The memory 13 is a memory device for storing an operating system, a device driver, an application program to be executed and data to be processed, being constituted of a plurality of DRAM modules. This memory 13 has system memory 131 mounted on the system board beforehand and an expansion memory 132 mounted by a user as necessary. For the DRAM module constituting the system and expansion memories 131 and 132, a high-speed memory, for instance a synchronous Dynamic Random Access Memory (DRAM) or a Rambus, to which a memory clock must be supplied for each bank is utilized.

This memory 13 is connected to the host/PCI bridge 12 via a dedicated memory bus having a data bus of 32-bit or 64-bit width. As a data bus for the memory bus, the data bus of the processor bus 1 may be used. In this case, the memory bus comprises an address bus and various memory control signal lines.

The host/PCI bridge 12 is a bridge LSI for interconnecting the processor bus 1 and the internal PCI bus 2 and serves as one of the bus masters for the PCI bus 2. This host/PCI bridge 12 has functions of transforming bidirectionally a bus cycle containing data and an address between the processor bus 1 and the internal PCI bus 2 and of controlling of access to the memory 13 via the memory bus.

The internal PCI bus 2 is an I/O bus of a clock synchronous type and all cycles thereon are performed in synchronization with a PCI bus clock. The frequency of the PCI bus clock is up to 33 MHz. The PCI bus 2 is provided with an address/data bus used in a timeshared manner. This address/data bus has a 32-bit width.

A data transfer cycle over the PCI bus 2 is constituted of an address phase and subsequent one or more data phases. An address and a transfer type are output in the address phase, and data of 8, 16, 24, or 32 bits are output in the data phase.

The display controller 14 is, one of the bus masters for the PCI bus 2 as in the case of the host/PCI bridge 12, displays the image data stored in a video memory (VRAM) 143 on a Liquid Crystal Display (LCD) 141 or an external Cathode-Ray Tube (CRT) display 142.

The DSP interface gate array 15 is one of the PCI devices and constitutes a DSP system for processing various sounds and telephone/data communication in cooperation with a DSP 151, a MODEM (CODEC) 152 and a sound CODEC 153.

The DSP interface gate array 15 communicates with the DSP 151, the MODEM (CODEC) 152 and the sound CODEC 153 under the control of a dedicated device driver program which is write in the memory 13, and controls sound processing and communication processing by utilizing the digital signal processing function of the DSP 151.

The internal PCI-ISA bridge 16 is a bridge LSI for interconnecting the internal PCI bus 2 and the internal ISA bus 3 and serves as one of the PCI devices. In the internal PCI-ISA bridge 16, a PCI bus arbiter and a DMA controller are incorporated. The BIOS ROM 19, the HDD 20, the keyboard controller 21, the RTC 22 and the I/O control gate array 23 are connected to the internal ISA bus 3.

The card controller 17 is one of the PCI devices and controls a PC card of PCMCIA or card bus specifications.

The PCI-DS bridge 18 controls bus connection or disconnection between the computer main body and the docking station 30 or the card dock 40. More particularly, the PCI-DS bridge 18 is a bridge LSI for linking the internal PCI bus 2 with the docking bus 7 equivalent to a PCI bus and serves as one of the PCI devices. This docking bus 7 is extended to the outside via the pin group 101 of the docking connector 10 and connected to the docking station 30 or the card dock 40.

As shown in FIG. 4, the RTC 22 has group 221 of registers and a comparison section 222. The group 221 consists of a register 221a for storing data indicating a current date, a register 221b for storing data indicating current time, a register 221c for storing alarm date data indicating a date set by an operator and a register 221d for storing alarm time data indicating time also set by the operator. The data indicating alarm time and date are set by the operator as time for instructing automatic input of power for the computer system.

The comparison section 222 compares the current time stored in the register 221b with the time set by the operator and stored in the register 221. The comparison section 222 also activates a control signal RTCIRQ# (later described) when the current time and the time stored in the register 221d coincide with each other.

The I/O control gate array 23 is a bridge LSI for linking the internal ISA bus 3 with the I²C bus 4. The array 23 incorporates a plurality of register groups, from which data can be read and into which data can be written, by means of the CPU 11 and power supply controller 24. By using these register groups, communications can be performed between the CPU 11 and the power supply controller 24 through the I²C bus 4.

FIG. 5 illustrates the I/O control GA 23 associated with the registers for storing data indicating power-ON factors for the computer system and data representing power failure conditions, respectively. The register group 231 consists of a power-ON factor register 231a and the state register 231b. The register 231a stores data indicating factors of switching ON power for the computer system and a register 231b stores data indicating loading state of the expansion unit. An I²C bus interface 232 performs interfacing between the I/O control GA 23 and the I²C bus 4. Data are written in the power-ON register 231a and the state register 231b by the power supply controller 24 through the I²C bus interface 232. In this specification, the power-ON indicates power supplement from a power supply to components of the computer.

From this I/O control gate array 23, a plurality of control signal lines connected to the docking station 30 or the card dock 40 are drawn to the outside via the pin group 102 of the docking connector 10. The I/O control gate array 23 detects docking/undocking between the computer main body and the docking station 30 or the card dock 40. The array 23 also performs control so as to prevent destruction of the expansion devices in the docking station 30 or the card dock 40 and malfunction of the system due to hot swapping when the computer main body with its power-ON is connected to the docking station 30 or the card dock 40.

The I²C bus 4 is a bidirectional bus, consisting one clock signal line and one data line (SDA). The bus 4 is drawn to the outside through the pin group element 103 of the docking connector 10.

The power supply controller 24 controls supplying of power from a power supply 25 to each component. Especially, the power supply controller 24 controls in accordance with the ON/OFF operation of a power supply switch (PSW) 26, the switching ON/OFF of a panel switch 27 achieved by opening and closing a panel, and a signal sent from the MODEM 152 and a signal sent from the RTC 22. The power supply controller 24 performs power supply control for docking/undocking with the docking station 30 or the card dock 40.

The power supply 25 can be connected to an AC power supply via an AC adapter, not shown. The AC adapter converts an AC current supplied from the AC power supply into a DC current of a specified value. The DC current is supplied to the power supply 25. The power supply 25 is connected to a built-in battery, not shown. The power supply 25 generates an operation voltage (±5V or ±12V) necessary for driving the computer main body from a voltage supplied via the AC adapter, a voltage supplied from the built-in battery or a voltage supplied from the docking station 30 or the card dock 40.

Next, the components of the docking station 30 of the FIG. 2 will be described.

Figure 6:
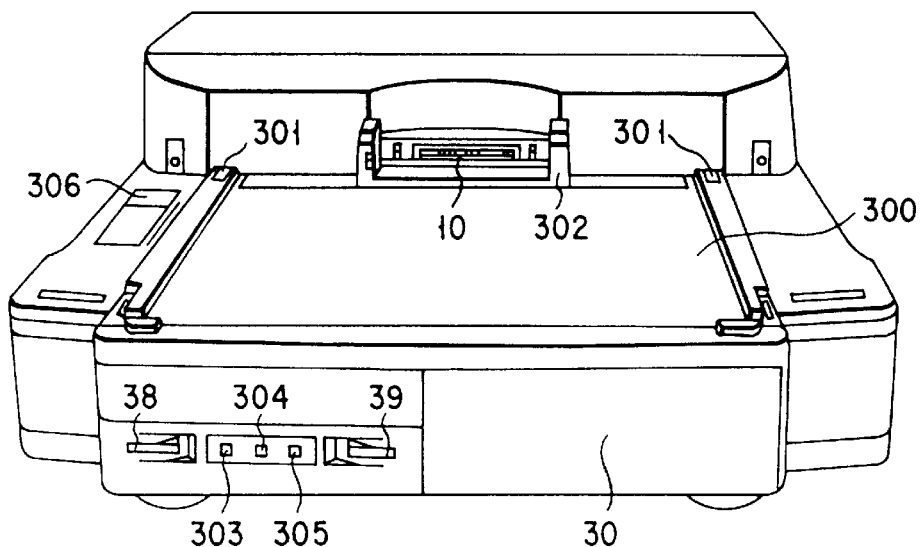
FIG. 6 is a view illustrating the appearance of the docking station with its structure shown in FIG. 2.

As noted above, the docking station 30 is an expansion unit to/from which the portable computer main body is connected or removed. FIG. 6 illustrates the appearance of the docking station 30 of the embodiment of the invention. FIG. 7 illustrates loading of the computer main body in the docking station 30.

Referring to FIG. 6, the casing of this docking station 30 is provided with a mounting surface 300 for housing the portable computer main body. This mounting surface 300 is nearly the same in size as the bottom of the portable computer main body and has guide sections in both left and right ends thereof for introducing the portable computer main body to a loading position. In the rear ends of the guide sections, guide pins 301 are provided, being protruded from the guide sections and inserted into holes of the bottom of the portable computer main body for fixing to secure its connection with the docking station 30 when the portable computer main body is set to the loading position and the docking connectors 10 are connected to each other. These guide pins 301 are pressed downward so as to be removed from the holes formed in the bottom surface of the portable computer main body when an eject switch 39 is pressed.

The docking connector 10 is provided in the rear end of this mounting surface 300. The docking connector 10 is connected to a docking connector 10 provided in the rear surface of the portable computer main body set to the loading position. In the casing of the docking station 30, an extruding section 302 is further provided so as to be freely slidable, being joined to the back face of the portable computer main body for pushing the portable computer main body forward along the mounting surface 300. Thus, the docking connectors 10 between the portable computer main body and the docking station 30 are separated from each other and the portable computer main body is ejected from the docking station 30.

The extruding section 302 is driven by a motor. But when the locking mechanism, later described, is in a specified location, this can be made manually slidable linked with the operation of a manual operation lever 306.

In the docking station 30, as shown in the drawing, there are provided a power supply switch 38, a power indicator 303, a drive-in use indicator 304, a docking indicator 305 and an eject switch 39. The power indicator 303 is lit to indicate that the docking station 30 is in a power-ON state. The drive-in use indicator 304 is lit for indicating access to, for instance the expansion HDD within the docking station 30. The docking indicator 305 starts flickering when the portable computer main body is set to the loading position and continues to be lit after the above-noted guide pins 301 have been correctly inserted into the holes of bottom surface of the portable computer main body and fixing completely. In this manner, in case where the portable computer main body and the docking station 30 are not correctly connected to each other for one reason or another, an alarm is raised by means of repeated flickering of the docking station 30.

The eject switch 39 is an operation switch for removing the computer main body docked with the docking station 30 therefrom. When this eject switch 39 is pressed, the above-noted guide pins 301 are removed from the holes created in the bottom surface of the portable computer main body. Then, the portable computer main body is ejected from the docking station 30 by the extruding section 302.

Referring to FIG. 8, in the right side of the docking station 30, there is provided a locking mechanism for realizing a security function regarding loading/unloading of the portable computer in the docking station 30. This locking mechanism comprises a key cylinder with a key hole 371 and a key 37 inserted into the key hole 371 so as to be freely removed for rotating the key cylinder. The locking mechanism has three positions, NORMAL, BLOCK and EMERGENCY positions, respectively corresponding to the rotational positions of the key cylinder.

The NORMAL position is for permitting loading/unloading of the portable computer in the docking station 30. When the key position of the key 37 is in the NORMAL position, if the portable computer is loaded to its loading position on the docking station 30, the portable computer is locked on the docking station 30 by the guide pins 301. When the eject switch 39 is pressed, the guide pins 301 are lowered. Then, the portable computer is ejected from the docking station 30 by the extruding section 302.

The BLOCK position is for prohibiting new loading and removing of the portable computer in and from the docking station 30. When the key position of the key 37 is in the BLOCK position, if the portable computer is loaded to its loading position on the docking station 30, the extruding section 302 is driven and the portable computer is ejected from the docking station 30. The pressing operation of the eject switch 39 is made invalid and the portable computer locked on the docking station 30 is maintained locked. Further, when power for the docking station 30 is switched ON with the portable computer already locked thereon, or when the locking mechanism is set in the BLOCK position, this state is maintained without any operations performed. Unless the portable computer is in the locked state, an eject operation is performed.

The EMERGENCY position is for permitting manual ejection of the portable computer without using the above-noted motor-driven lock/eject mechanism at all. Only when the key position of the key 37 is in the EMERGENCY position, manual ejection of the portable computer using the manual type operation lever 306 is possible. More particularly, a linking mechanism for mechanically linking together the manual operation lever 306 and the extruding section 302 is in a separated state because of the relative arrangements of the key cylinder position and the linking mechanism at the time other than the EMERGENCY position. Thus, only in the EMERGENCY position, the manual operation lever 306 and the extruding section 302 are mechanically linked with each other.

The DS-PCI/ISA bridge device 31 provided in the docking station 30 having the above-described structure is a bridge LSI for interconnecting the docking bus 7 drawn out of the computer main body to the docking station 30, the external PCI bus 5 and the external ISA bus 6. This DS-PCI/ISA bridge device 31 is one of the PCI devices.

The DS controller 33 is a microcomputer for controlling switching ON/OFF of power for the docking station 30 and docking/undocking between the portable computer main body and the docking station 30. This communicates with the power supply controller 24 and the I/O control gate array 23 of the computer main body by using the I2 C bus 4.

The EEPROM 34 is for storing PnP information necessary for plug and play, such as the attribute (address, DMA channel, IRQ number and others) of the expansion card fitted into the expansion slot of the docking station 30. This PnP information is read from the EEPROM 34 by means of the control gate array 23 via the I²C bus 4 under control of the system BIOS of the BIOS ROM 19 when the computer main body is docked with the docking station 30 or when power is switched ON for the computer main body or the docking station 30.

The card controller 35 controls the PC card based on the PCMCIA/card bus as in the case of the card controller 17 within the computer main body.

A power supply circuit (DS PS) 331 for supplying an operation voltage to each component of the docking station 30 is connected to the DS controller 33. This power supply circuit 331 produces various operation voltages (±5V, ±12V, etc.) based on voltages supplied from the AC adapter (not shown) connected to the AC power supply.

Next, the card dock 40 will be described.

As shown in FIG. 3 the card dock 40 is also an expansion unit loaded in the portable computer main body so as to be removable.

The card controller 41 provided in this card dock 40 is for controlling the PC card based on the PCMCIA/card bus.

The EEPROM 43 stores PnP information necessary for plug and play, for instance the attribute of the PC card fitted into the PC card slot of the card dock 40. This PnP information is read from the EEPROM 43 by means of the control gate array 23 via the I²C bus 4 under control of the system BIOS of the BIOS ROM 19 when the computer main body is docked with the card dock 40 or when power is switched ON for the computer main body or the card dock 40.

This card dock 40 is provided with an AC adapter not shown in FIG. 3. The power supply of this AC adapter will be described later.

Next, the casing structure of the card dock 40 will be described by referring to FIGS. 9 and 10.

Figure 9:
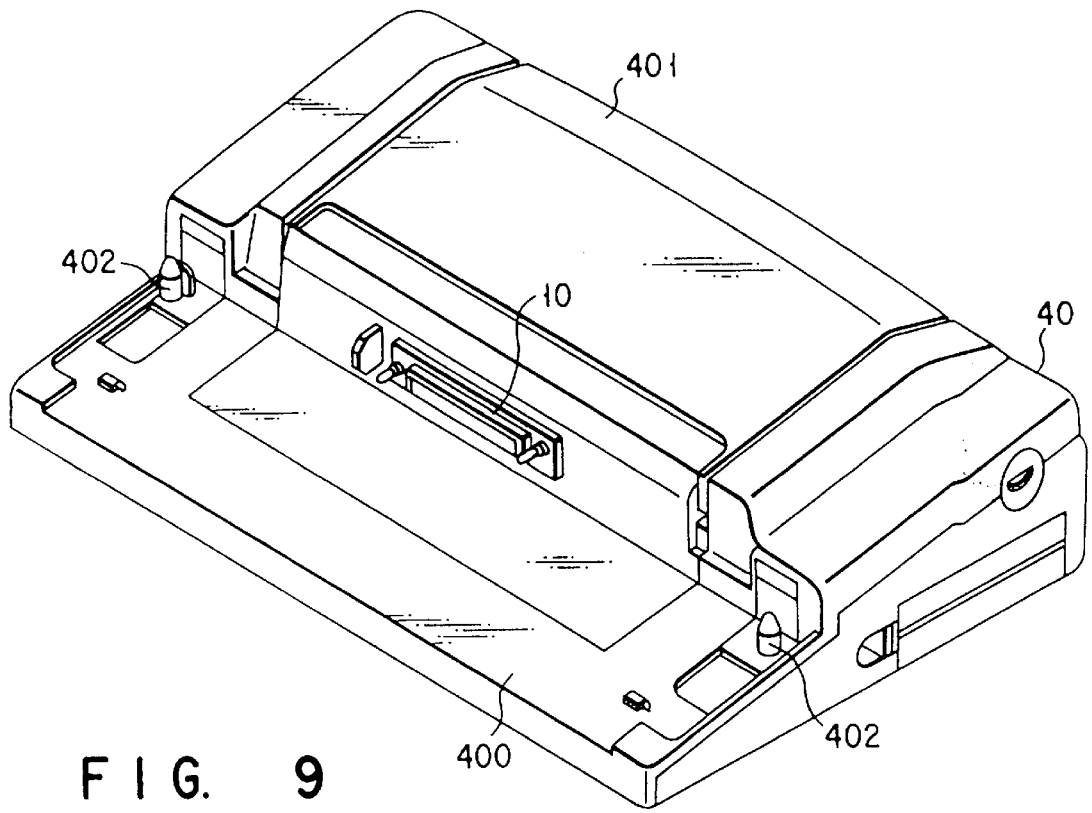
FIG. 9 is a front view of the appearance of the card dock with its structure shown in FIG. 3.

As illustrated in FIG. 9, the casing of the card dock 40 is provided with a mounting surface 400 for housing the portable computer main body. This mounting surface 400 is almost the same in size as the bottom surface of the portable computer main body. In the rear end portions of both left and right ends of the mounting surface 400, there are provided guide pins 402 for guiding the portable computer main body to its loading position in such a manner that the pins are inserted into holes formed in the bottom surface of the portable computer main body and the connectors 10 of the portable computer main body and the card dock 40 are connected to each other. These guide pins 402 move back and forth on the mounting surface 400 interlockingly with the operation of a manual handle 401. These are placed in front portions on the mounting surface 400 when the manual handle 401 is raised by a user. They are placed in back portions on the mounting surface 400 when the manual handle 401 is pushed down as shown in the drawing. When the portable computer main body is to be loaded in the card dock 40, first the manual handle 401 is raised and the guide pins 402 are fitted into the holes created in the bottom surface of the portable computer main body in this state. Then, by means of pressing-down of the manual handle 401, the guide pins 402 lead the portable computer main body to the loading position on the card dock 40 and the connectors 10 are connected to each other. When the portable computer main body is to be removed from the card dock 40, the manual handle 401 is raised, the portable computer is then pushed forward by the guide pins 402 and the connectors 10 are disconnected from each other.

Figure 10:
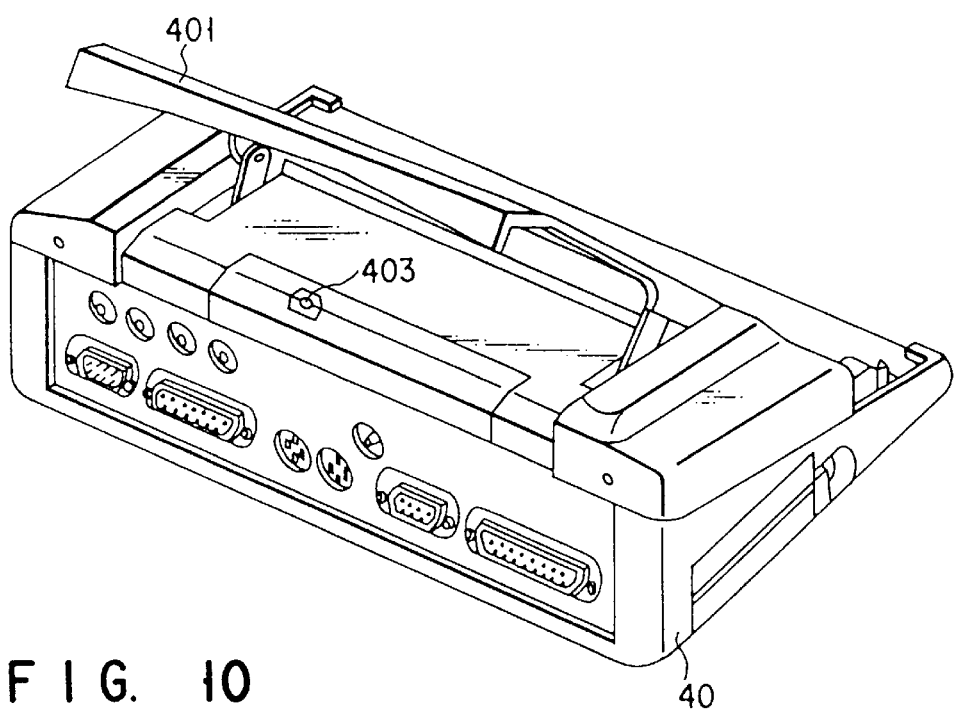
FIG. 10 is a rear view of the appearance of the card dock shown in FIGS. 3 and 9.

FIG. 10 illustrates the appearance of the card dock 40 when seen from its back face. In the drawing, the manual handle 401 is shown to be in its raised state. A detection switch 403 provided in the casing of the card dock 40 is utilized for detecting opening/closing of the manual handle 401.

Figure 11A:
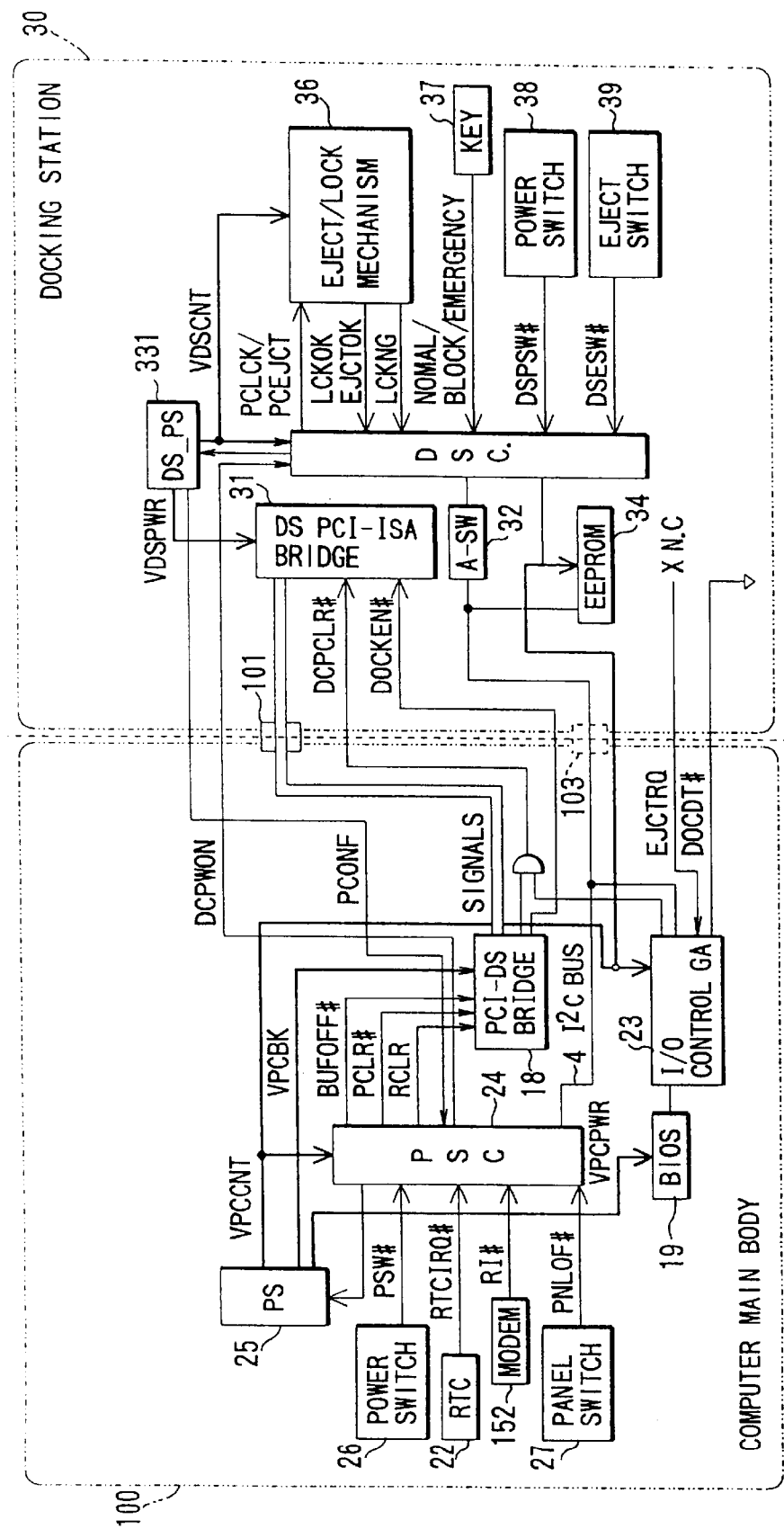

FIG. 11A illustrates, among the system structure units shown in FIGS. 1 and 2, the structure unit for docking/undocking between the computer main body 100 and the docking station 30. FIG. 11B illustrates the structure unit for docking/undocking between the computer main body 100 and the card dock 40, being extracted from those shown in FIGS. 1 and 3. In the drawing, a thick line indicates a power line.

Signal groups used for docking/undocking will be described hereinbelow.

<System—Power Supply>

VPCCNT: VPCCNT is a power supply of a control system constantly output from the power supply circuit (PS) 25 of the computer main body 100. This VPCCNT is supplied to the I/O control gate array 23 and the power supply controller 24 for performing communications with the docking station 30 or the card dock 40 in order to control loading/unloading of the computer main body 100.

VPCBK: VPCBK is a backup power supply output from the power supply circuit (PS) 25 and supplied to the PCI-DS bridge device 18 during power-ON and suspension. VPCBK is also supplied to the memory 13, etc., of FIG. 1 in order to prevent erasing of information necessary for resumption.

VPCPWR: VPCPWR is a driving power supply output from the power supply circuit (PS) 25 and output only during power-ON. VPCPWR is supplied to the BIOS ROM 19.

<Power Supply Controller (PSC)>

PSW#: (Input) PSW# is a power supply switch signal from the power supply switch 26 and becomes Low when the power supply switch 26 is pressed.

PTCIRQ#: (Input) RTCIRQ# is an interruption signal from the RTC 22 and becomes Low when active.

RI#: (Input) RI# is a ring signal from the modem 152 and becomes Low when active.

PNLOF#: (Input) PNLOF# is a panel switch signal from the panel switch 27 and becomes Low when the display panel of the computer main body is opened.

BUFOFF#: (Output) BUFOFF# is a signal for switching OFF the gate of the gate array connected to the bus driven by a driving power supply and used, for instance, when suspension is indicated to the PCI-DS bridge device 18. This becomes Low when active.

PCLR#: (Output) PCLR# is a reset signal output during power-ON and OFF and becomes Low when active.

RCLR: (Output) RCLR is a reset signal output during resuming and power-ON and becomes High when active.

DCPWON: (Output) DCPWON is a signal for instructing to switch ON the power supply circuit 44 in the card dock 40 and to switch on the docking station 30; it becomes High when active.

<I/O Control Gate Array>

DOCDT#: (Input) DOCDT# is a voltage value for a specified pin of the connector 10 and becomes Low when the computer main body is connected to the docking station 30 or the card dock 40.

<BIOS>

The system BIOS stored in the BIOS ROM 19 controls the power supply controller 24 and the docking station 30 and transfers data therewith via the I/O control gate array 23.

DCPCLR#: (Output) DCPCLR# is a reset signal for the gate array in the docking station 30 or the card dock 40 and becomes Low when active.

DOCKEN#: (Output) DOCKEN# is a signal for permitting bus connection with the docking station 30 or the card dock 40 and used when bus connection is to be notified to the DS-PCI/ISA bridge device 31 in the docking station 30 or the card controller 41 in the card dock 40. This becomes Low when active.

<Docking Station>

DSPSW#: (Input) DSPSW# is a signal for indicating pressing-down of the power supply switch 38 in the docking station 30 and becomes Low when active.

DSESW#: (Input) DSESW# is a signal for indicating pressing-down of the eject switch 39 in the docking station 30 and becomes Low when active.

PCLCK: (Output) PCLCK is a signal for operating the mechanism for locking the computer main body and sent to the above-noted eject/lock mechanism 36 for performing a locking/ejecting operation by means of motor driving.

PCEJCT: (Output) PCEJCT is a signal for operating the mechanism for ejecting the computer main body and sent to the eject/lock mechanism 36.

LCKOK: (Input) LCKOK is a signal for indicating completion of locking the computer main body.

LCKNG: (Input) LCKNG is a signal for indicating getting caught of the lock during locking of the computer main body.

EJCTOK: (Input) EJCTOK is a signal for indicating completion of ejecting the computer main body.

NORMAL/BLOCK/EMERGENCY: (Input) These are signals for indicating the positions of the key 37. NORMAL indicates placing of the key 37 in a normal operation position. BLOCK position indicates placing of the key 37 in a position preventing mechanical ejection of the main body when docked and in a position preventing docking thereof when undocked. EMERGENCY indicates placing of the key 37 in a position permitting manual ejection of the computer main body.

VDSCNT: VDSCNT is a control system power supply and always supplied from the power supply circuit (DS PS) 331 when there is an AC input.

VDSPWR: VDSPWR is a driving power supply and supplied to the PCI slot, the bay and others from the power supply circuit (DS PS) circuit 331 during power-ON.

PCONF: (Output) PCONF is a signal becoming active when VDSPWR is normal and becomes High when active. The power supply circuit (DS PS) 331 is normally operable only after the AC adapter has been connected.

Power supplies for the docking station controller 33 and the device connected to the I²C bus 4 in the computer main body are different from each other. Thus, the controller 33 must be connected to the I²C bus 4 by an analog switch 32.

<CDOC>

EJCTRQ: (Output) EJCTRQ is a signal for indicating that the handle 401 has moved to a certain position and the computer main body is about to be ejected and becomes High when active. EJCTRQ is output from the detection switch 403 shown in FIG. 10.

PCONF: (Output) PCONF is a signal for indicating that power supplied to the PC card is ON.

VCDPWR: VCDPWR is a driving power supply output from the power supply circuit 44 and supplied to the PC card slot. The power supply circuit 44 of the card dock 40 can operate by means of power provided from the computer main body even while the AC adapter is in a disconnected state.

Figure 12:
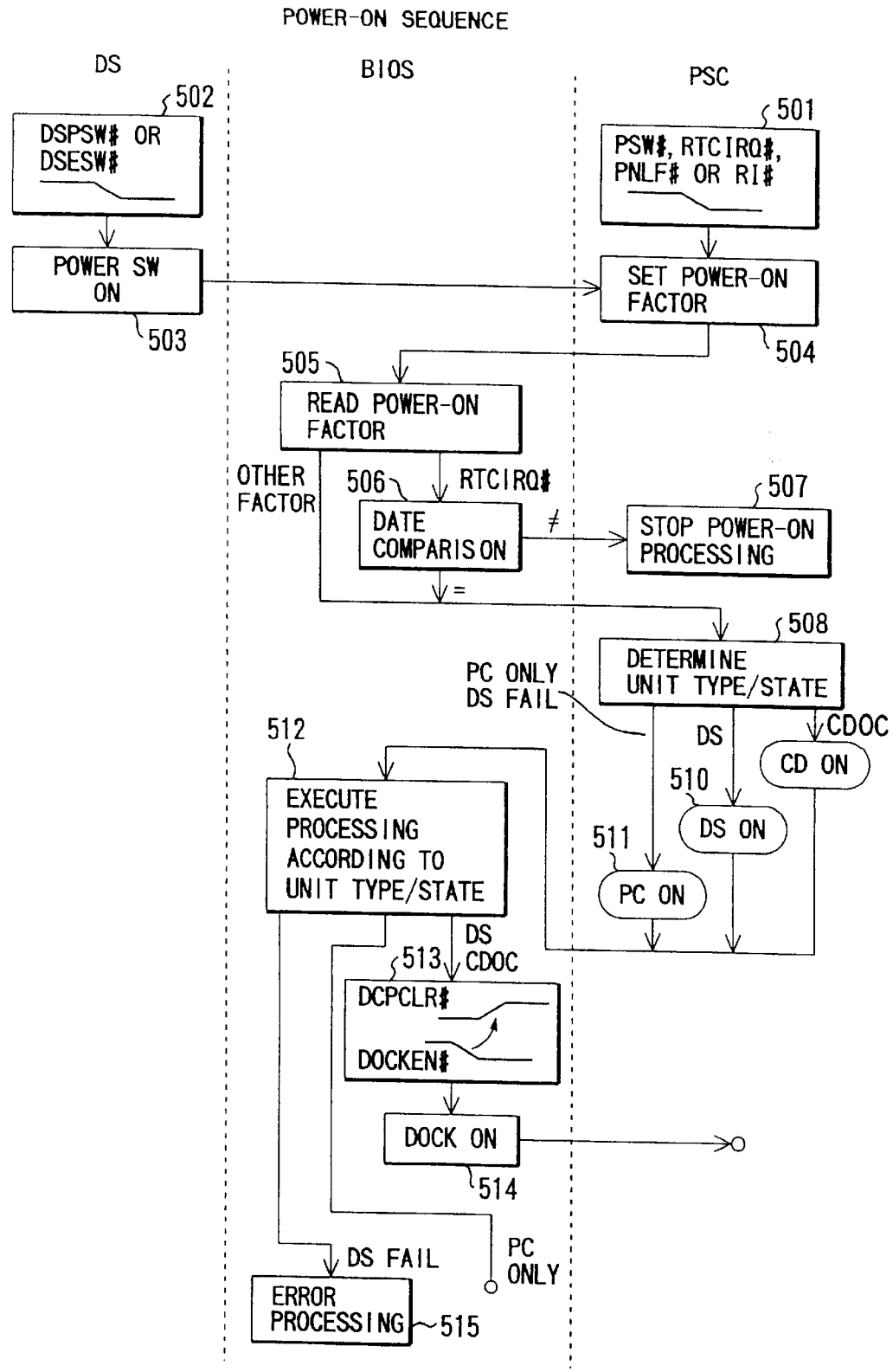
FIG. 12 is a view showing a sequence of changing from a power OFF state to a power-ON state of the computer system of the embodiment.

Next, an operation when the computer system of the embodiment is to change from a power OFF state to a power-ON state will be described by referring to FIG. 12.

After the computer system has changed from the power OFF state to the power-ON state, first the power source controller 24 determines a factor of system power-ON and sets the result of this determination in the power-ON factor register 231*a* of the I/O control gate array 23. The factors of starting power-ON for the computer system of the embodiment are like the following:

(1) Switching ON power for the computer main body;
(2) Opening of the display panel of the computer main body;
(3) Interruption of the RTC 22;
(4) Interruption of the model ring;
(5) Switching ON power for the docking station; and
(6) Switching ON the eject switch of the docking station.

Power for the computer main body is switched ON when the eject switch of the docking station is pressed in order to determine whether or not to permit removing of the computer main body from the docking station.

When the power supply switch of the computer main body is pressed, a PSW# signal from the power supply switch 26 becomes Low. When the display panel of the computer main body is opened, a PNLOF# signal from the panel switch 27 becomes Low. In the case of the RTC interruption, a RTCIRQ# from the RTC 22 becomes Low and in the case of the model ring interruption, a RI# signal from the modem 152 becomes Low (501).

When the power supply switch of the docking station is pressed, a DSPSW# signal from the power supply switch 38 becomes Low and when the eject switch of the docking station is pressed, a DSESW# signal from the eject switch 39 becomes Low (502). The DS controller 33 monitors these signals and notifies the power supply controller 24 of the factor of power-ON by a command (Power ON) via the I²C bus 4 (503).

The power supply controller 24 monitors various signals and commands sent into the computer main body via the I²C bus 4, determines a factor of power-ON for the computer system and sets the result of this determination in the power-ON factor register 231a (504).

Determination of the factor of power-ON and setting of the result of this determination by the power supply controller 24 enables transmitting of the factor of power-ON to a high-order application program, for instance the BIOS 19. This makes it possible to execute processing in accordance with each of the power-ON factors.

After the power-ON factor has been set in the register 231a by the power supply controller 24, the BIOS 19 reads the determination result set in this register (505). For example, if the determination result read here is interruption from the RTC 22, the BIOS 19 reads data from the registers 221a and 221c of the RTC 22 and compare these (506). The register 221a stores data indicating a current date and the register 221c stores data indicating an alarm date set by the operator. When these dates do not coincide with each other, the BIOS 19 determines improper switching ON of power for the computer system, instructs the power supply controller to stop power-ON processing and clears data in the register 221a of the I/O controller GA 23. The power supply controller 24 stops the power supply in accordance with the instruction from the BIOS 19 (507).

Therefore, the portable computer can be set so as to execute processing in accordance with various factors of power-ON. For example, a timer is set to a time before coming to the company and then, it is possible to download the news of the date by using personal computer communications. This greatly improves its operability.

When the BIOS 19 determines coincidence between the dates or when the power-ON factor is one other than the interruption from the RTC 22, the power supply controller 24 determines the existence of the connected expansion unit and the state thereof (508). The power supply controller 24 then writes data indicating the state of the expansion unit in the state register 231b. The power supply controller 24 switches ON power for the computer main body based on the result of this determination and instructs the expansion unit to switch ON its power when the unit is connected (509 to 511).

After the power has been switched ON by the power supply controller 24 and an instruction for supplying of power has been given therefrom, the BIOS 19 starts processing in accordance with the type/state of the expansion unit (512). When the docking station 30 or the card dock 40 is connected to the computer main body, a signal for permitting connection of the system bus to the connected expansion unit is made active and docking with the expansion unit is completed (513 and 514).

When an error is detected during determining of the state of the expansion unit by the power supply controller 24, the BIOS 19 executes error processing in accordance with the detected error (515). When the expansion unit is not connected, normal processing, for instance resuming processing, is performed.

Determination of the type/state of the expansion unit by the power supply controller 24 will now be described by referring to FIG. 13. An example of an error code written in the error register 231b of the I/O controller GA by the power supply controller 24 is shown in FIG. 14.

The power supply controller 24 first determines whether a DOCDT# signal is active or not by referring to a given register of the I/O control gate array 23 (Step S1). When this is determined to be inactive, disconnection of the docking connector is determined, that is, neither the docking station 30 nor the card dock 40 is connected, and this processing is finished (Step S2).

When the signal is determined to be active, determination is made as to whether the AC adapter is connected to the connected expansion unit (the docking station 30 or the card dock 40) or not (Step S3). When the AC adapter is not connected, determination is made as to whether a PCONF signal is active or not (Step S4). A power line from the AC adapter is sent to the computer main body via the connector and connected to the power line from the AC adapter of the computer main body. Thus, connection of this AC adapter can be determined in a manner that the power supply controller 24 monitors a voltage for this power line.

When the PCONF signal is active, determining that the card dock 40 has been connected (Step S5) and this processing is finished. Here, a code 00h indicating no error is written in the state register 231b.

When the signal is inactive, determining either (1) power failure in the docking station 30 though the same has been connected (including disconnection of the AC adapter) or (2) power failure in the card dock 40 though the same has been connected (Step S6) and this processing is finished. Here, an error code A3h is written in the state register 231b.

The AC adapter must be connected for actuating the docking station 30. However, the card dock 40 can be actuated by means of power supplied from the built-in battery in the computer main body even when the AC adapter is not connected. This difference occurs because of a difference in power consumption.

When the AC adapter is connected, the power supply controller 24 issues a command (Read DS Type command) for reading a status intrinsic to the device to the DS controller 33 and determines whether communications have been correctly performed or not (Step S7 and Step S8). Here, if impossible data is returned, the power supply controller 24 writes an error code A4h in the state register 231b determining that communications cannot be correctly performed.

When no response is given with respect to the command twice continuously (Step S10 and Step S11), the power supply controller 24 determines whether a PCONF signals is active or not (Step S10) and when this is active, determines connection of the card dock 40 (Step S13) and finishes this processing. The code 00h indicating no error is then written in the state register 231b. When the signal is inactive, the controller 24 determines power failure in the card dock 40 though the same has been connected (Step S14) and finishes this processing. An error code B2h is then written in the state register 231b.

On the other hand, if an error response has been made with respect to the DS Type command, the occurrence of certain failure is determined though the docking station 30 is connected (Step S 15). This failure is identified in accordance with the content of the returned error response and any of error codes A0h, A1h, A8h or A9h is written in the state register 231b based on the content of the error.

If there is a normal response returned with respect to the Read DS Type command, determination is made as to whether a PCONF signal is active or not (Step S16). When this is active, determining that the docking station 30 has been connected (Step S17), this processing is finished. Here, the code 00h indicating no error is written in the state register 231b. When the PCONF signal is inactive, determining the occurrence of power failure in the docking station 30 which has been connected (Step S18), this processing is finished. In this case, the error code A2h is written in the state register 231b.

Determination of the docking state of the computer main body and the power supply condition for the docking station 30 or the card dock 40 and the result of this determination enable the power-ON factors to be transmitted to the high-order application program, for instance the BIOS 19. The BIOS 19 can perform control in accordance with the error codes set in the register of the I/O control gate array 23. Thus, by displaying the error message indicating disconnection of the AC adapter on the display or issuing an alarm sound, errors can be notified to the operator. As a result, determination and processing based on the class of the loaded expansion unit can be properly performed. Moreover, for instance, even when the docking station 30 is used with no power supplied thereto, it is possible to prevent troubles such as hanging up of the whole system and the like.

Apparent from the foregoing, according to the invention, it is possible for the high-order application program to execute processing in accordance with each power-ON factor for the reason that the power supply controller can transmit the power-ON factors for the computer system to the high-order application program, for instance the operating system.

According to the invention, the power supply controller can determine the loading state of the computer system and the unit type thereof, determine the power-ON state depending on the loading condition thereof and transmit the result of this to the high-order application program, for instance the operating system. This makes it possible for the high-order application program to execute processing in accordance with the transmitted power-ON state.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A computer system comprising:
    a timer configured to store current date information, current time information alarm date information and alarm time information, and output a timer signal when the current time information and the alarm time information coincide with each other, the alarm time information and the alarm date information being set by an operator, the timer signal indicating that the timer triggers a power ON for necessary components in the computer system;
    register configured to store the timer signal; and
    a control section formed of a program configured to read out the current date information and the alarm date information from the timer and compare the current data information and the alarm date information in response to storage of the timer signal to said register, and execute power-ON processing when the current date information and the alarm date information coincide with each other.

2. The computer system according to claim 1, wherein the control section includes a basic input/output system (BIOS).

3. The computer system according to claim 1, wherein said register enables to store plural power-ON factor signals indicating reasons of power-ON of the computer system, the signals including the timer signal, and said control section, when said register stores a power-ON factor signal, determines whether the power-ON factor signal is the timer signal, and, when it is determined that the power-ON factor signal is the timer signal, read out the current date information and the alarm date information from the timer and compare the current data information and the alarm date information.

4. A computer system comprising:
    a display panel which is provided so as to be rotatable between an open state and a closed state, and having a display for displaying information;
    a register for storing data indicating a factor which triggers power ON for necessary components in the computer system;
    a switch for detecting the open state of the display panel and outputting a panel signal;
    a power supply controller for storing, in response to the panel signal, panel data into the register; and
    a control section formed of a program for reading out data stored in the register, and for outputting a power-ON signal to the power supply controller when the read out data comprises the panel data.

5. The computer system according to claim 4, wherein the control section includes a basic input/output system (BIOS).

6. The computer system according to claim 4, wherein said register enables to store plural power-ON factor signals indicating reasons of power-ON of the computer system, the signals including the timer signal, and said control section, when said register stores a power-ON factor signal, determines whether the power-ON factor signal is the timer signal, and, when it is determined that the power-ON factor signal is the timer signal, read out the current date information and the alarm date information from the timer and compare the current data information and the alarm date information.

7. A computer system comprising a computer main body which includes:
    a timer configured to store current date information, current time information, alarm date information and alarm time information, and output a timer signal when the current time information and the alarm time information coincide with each other, the alarm time information and the alarm date information being set by an operator, the timer signal indicating that the timer triggers a power ON for necessary components in the computer system;

a register configured to store the timer signal; and a control section formed of a program configured to read out the current date information and the alarm date information from the timer and compare the current data information and the alarm date information in response to storage of the timer signal to said register, and execute power-ON processing when the current date information and the alarm date information coincide with each other.

8. The computer system according to claim 7, wherein the control section includes a basic input/output system (BIOS).

9. The computer system according to claim 7, wherein the control section outputs the power-ON signal when the factor indicates that the signal is generated by a component of the computer main body.

10. The computer system according to claim 2, further comprising an expansion unit attachable to the computer main body, wherein the control section outputs the power-ON signal when the factor indicates that the signal is generated by a component of the expansion unit.

11. The computer system according to claim 7, wherein said register enables to store plural power-ON factor signals indicating reasons of power-ON of the computer system, the signals including the timer signal, and said control section, when said register stores a power-ON factor signal, determines whether the power-ON factor signal is the timer signal, and, when it is determined that the power-ON factor signal is the timer signal, read out the current date information and the alarm date information from the timer and compare the current data information and the alarm date information.

12. A computer system comprising:

a computer main body;

an expansion unit attachable to the computer main body;

wherein the computer main body includes:

a register for storing-data indicating a factor which triggers a power ON for necessary components in the computer system, a controller for receiving a signal indicating a power-ON request, and storing the factor of the power-ON request into the register, and a control section formed of a program for reading out data stored in the register and instructing the controller to detect a type and a power supply state of the expansion unit in accordance with the read out data and for executing power-ON processing corresponding to the detected type of the expansion unit when the detected power supply state shows no error, the power-ON processing being inhibiting when the detected power supply state shows an error.

13. The computer system according to claim 12, wherein the control section includes a basic input/output system (BIOS).

14. The computer system according to claim 12, wherein said register enables to store plural power-ON factor signals indicating reasons of power-ON of the computer system, the signals including the timer signal, and said control section, when said register stores a power-ON factor signal, determines whether the power-ON factor signal is the timer signal, and, when it is determined that the power-ON factor signal is the timer signal, read out the current date information and the alarm date information from the timer and compare the current data information and the alarm date information.

15. A computer comprising:

a timer configured to store current date information, current time information, alarm date information and alarm time information, and output a timer signal when the current time information and the alarm time information coincide with each other, the alarm time information and the alarm date information being set by an operator;

a register configured to store data indicating a factor which triggers a power ON for necessary components in the computer system;

a controller configured to receive a signal indicating a power-ON request, and store a factor of the power ON into the register; and a control section formed of a program configured to read out the factor stored in the register and compare the current data information and the alarm date information in response to storage of the timer signal to said resister, execute the power-ON processing when the current date information coincides with the alarm date information, and inhibit the power-ON processing when the current date information does not coincide with the alarm date information.

16. The computer system according to claim 15, wherein said register enables to store plural power-ON factor signals indicating reasons of power-ON of the computer system, the signals including the timer signal, and said control section, when said register stores a power-ON factor signal, determines whether the power-ON factor signal is the timer signal, and, when it is determined that the power-ON factor signal is the timer signal, read out the current date information and the alarm date information from the timer and compare the current data information and the alarm date information.

17. A method of executing a power-ON processing of a computer system, comprising:

setting, by an operator, alarm time information and alarm date information into a timer which stores current time information and current date information;

reading out the current time information and the alarm time information from the timer and comparing the current time information and the alarm time information;

outputting a timer signal when the current time information and the alarm time information coincide with each other, the timer signal indicating that a timer triggers a power ON for necessary components in the computer system;

storing the timer signal into a register;

reading out the current date information and the alarm date information from the timer and comparing the current data information and the alarm date information in response to storage of the timer signal to said register; and executing power-ON processing when the current date information and the alarm date information coincide with each other.

18. The method according to claim 17, further comprising:

storing a further power-ON factor signal indicating reasons of power-ON of the computer system in the register; and when said register stores the at least one power-ON factor signal, determining whether the power-ON factor signal is the timer signal, and, when it is determined that the power-ON factor signal is the timer signal, reading out the current date information and the alarm date information from the timer and comparing the current data information and the alarm date information.

* * * * *